Aug. 4, 1931.　　　V. C. ARMSTRONG　　　1,817,225
WELDED RAIL JOINT CONSTRUCTION
Filed Feb. 24, 1931　　2 Sheets-Sheet 1
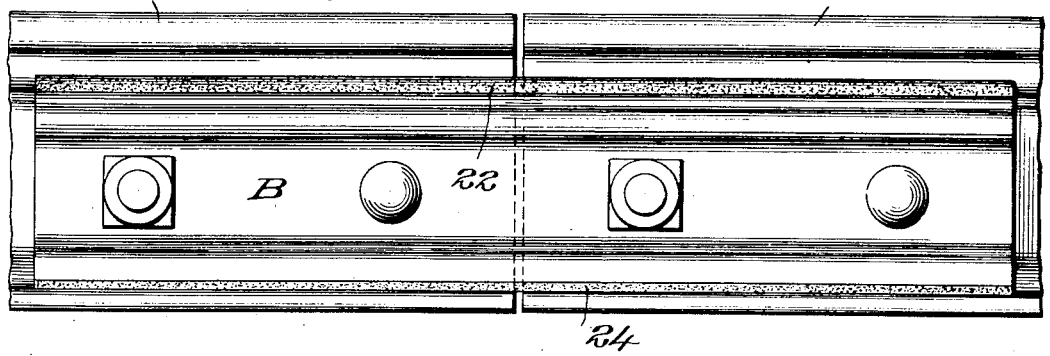
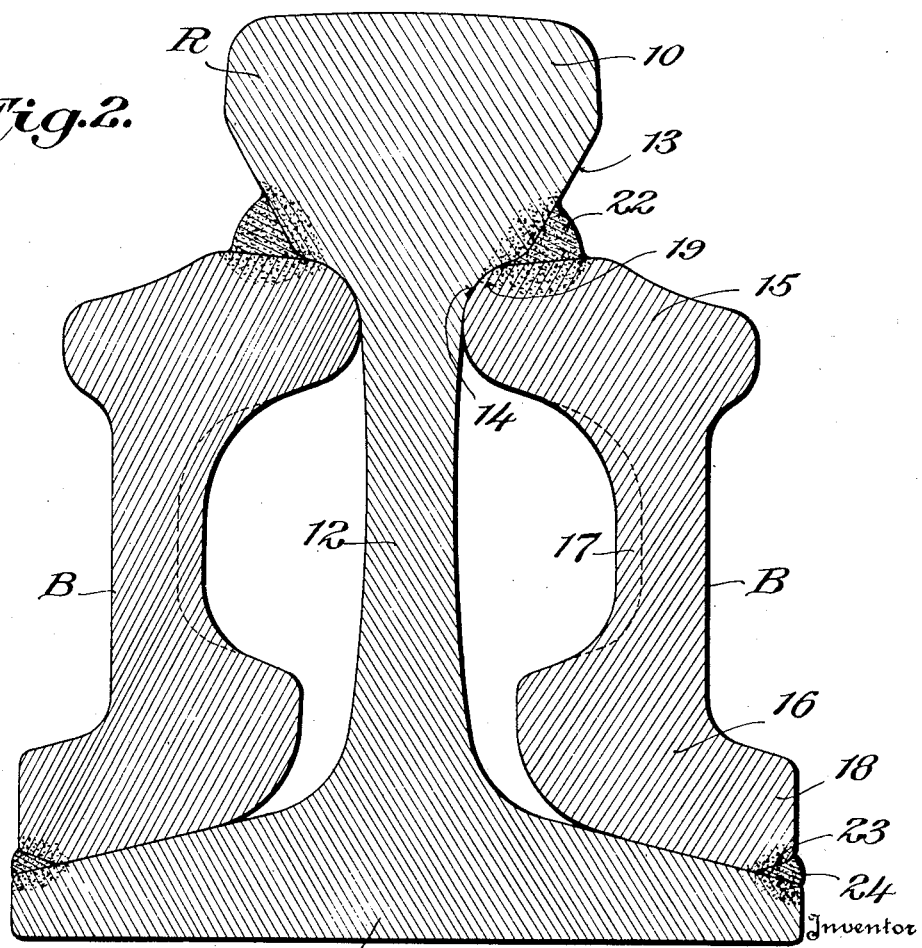
Inventor
Victor C. Armstrong,
By D. P. Wolhaupter
his Attorney Aug. 4, 1931.  V. C. ARMSTRONG  1,817,225
WELDED RAIL JOINT CONSTRUCTION
Filed Feb. 24, 1931   2 Sheets-Sheet 2
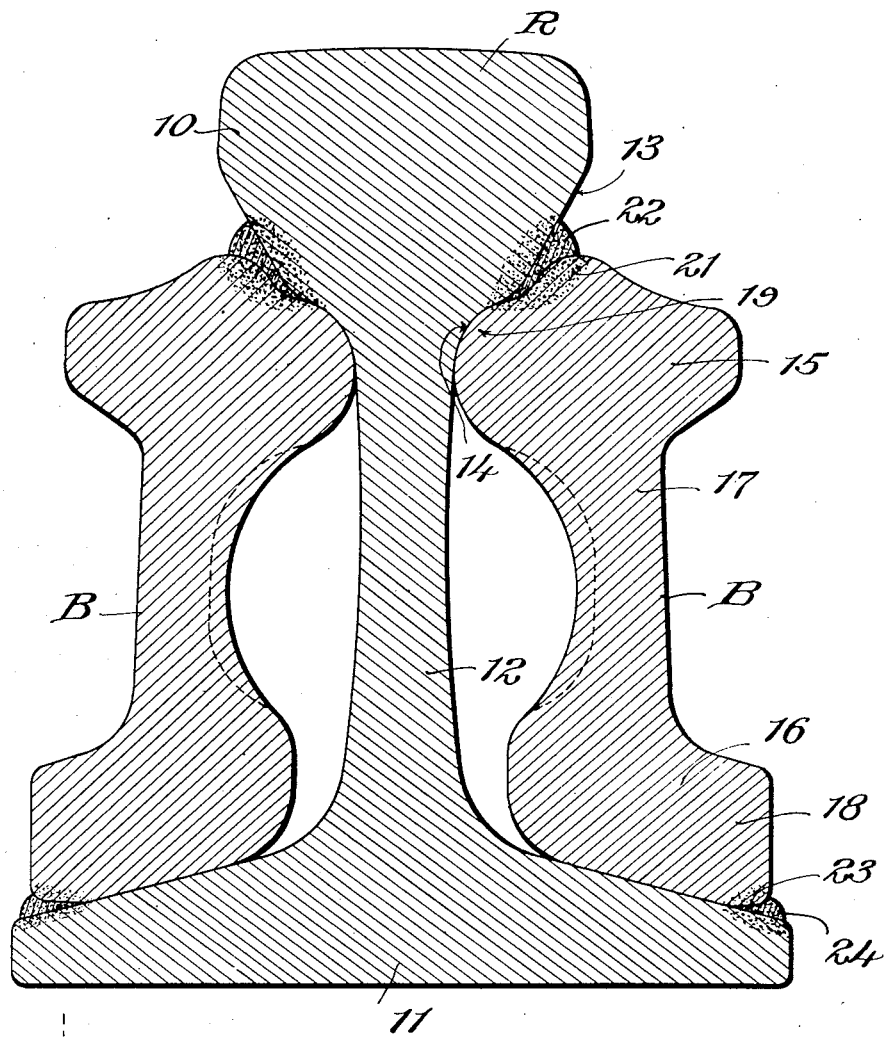
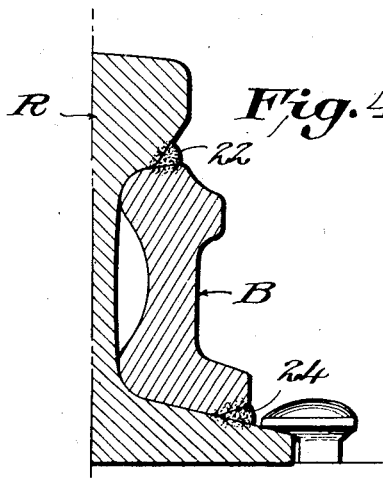
Inventor
Victor C. Armstrong,
By D. P. Wolhaupter
Attorney Patented Aug. 4, 1931

1,817,225

UNITED STATES PATENT OFFICE

VICTOR C. ARMSTRONG, OF HACKENSACK, NEW JERSEY, ASSIGNOR TO THE RAIL JOINT COMPANY, OF NEW YORK, N. Y., A CORPORATION OF NEW YORK

WELDED RAIL JOINT CONSTRUCTION

Application filed February 24, 1931. Serial No. 517,983.

This invention relates to improvements in welded rail joints of the type in which the rails are joined together by splice bars and welded seams are formed between the heads and the bases of the rails and the splice bars, respectively, whereby a strong, durable and efficient joint is provided requiring little or no attention over long periods of service.

The invention has a twofold purpose; viz, to provide a novel rail and splice bar combination especially adapted for the convenient and expeditious production of a welded rail joint, and to provide a welded rail joint embodying a weld of large capacity and great strength located inwardly of the vertical plane of the side of the rail head and adjacent to the point of load carrying contact between the head of the splice bar and the rail so as most effectively to weld together the joint and rail and at the same time protect the weld from wheel flange engagement above the head of the splice bar.

With the foregoing and other purposes in view, which will become more fully apparent to those skilled in the art to which the invention appertains as the nature of the invention is better understood, the same consists in the novel combination and arrangement of features as will be hereinafter more fully described, illustrated in the accompanying drawings and defined in the appended claims.

In the drawings, wherein like characters of reference denote corresponding parts in the different views:—

Figure 1 is a side elevation of a welded rail joint embodying the features of the invention.

Figure 2 is a transverse section through the joint illustrated in Fig. 1.

Figure 3 is a view similar to Fig. 2 illustrating a slightly alternative embodiment of the invention; and Figure 4 is a view similar to Figs. 2 and 3 illustrating another slightly alternative embodiment of the invention.

Referring to the drawings in detail, it will be observed that the present rail joint preferably is of the so-called "headfree" type embodying both headfree rail and headfree splice bars, the former being designated as R, R', respectively, and the latter as B, B.

The opposite splice bars B, B, and joints are preferably or may be duplicates of one another, and therefore, the joint at one side only of the rails need be described in detail. Thus, each rail includes, as usual, a head 10, a base 11 and a web 12, and in accordance with the invention each rail is characterized by the head thereof being of truncated, inverted pyramidical form; which is to say that the side thereof, beginning at a point suitably spaced downward from the top or gage surface thereof, is inclined inwardly, as at 13, toward the related head fillet 14 of the rail.

The splice bar B includes, as usual, a head 15, a base 16 and a web 17, and while said bar may be of any preferred type, the same preferably is of the so-called "toeless" type characterized by a relatively narrow foot flange 18 the outer edge of which is adapted to lie either substantially flush with the outer edge of the rail flange, or inwardly of the outer edge of the rail flange as desired.

The bar B is formed at its base for fishing contact with the upper face of the rail flange, and at the inner upper corner of its head with a transversely rounded rib 19 for loading engagement with the head fillet 14 of the rail, and said bar is adapted to be drawn into engagement with the rails R, R' by means of joint bolts in the usual well-known manner.

The top face of the splice bar adjacent to the rib 19 may be either flat, or substantially flat, as illustrated in Fig. 2, or may be provided with an upwardly directed, longitudinally extending strengthening rib as indicated at 21 in Fig. 3. In either event, due to the inward slope of the lower portion 13 of the side face of the rail head, it is apparent that a pocket of substantially V-shape cross section is formed between the lower portion of the rail head and the top of the splice bar, and that this pocket is disposed inwardly of the vertical plane of the side of the rail and extends closely adjacent to the zone of loading contact between the rib 19 of the splice bar and the head fillet of the rail.

The weld at the head of the joint is adapted to be formed within the V-shaped pocket mentioned, whereby a strong joint is most effectively made in the immediate vicinity of the zone of loading engagement between the rail and the head of the splice bar, and whereby the weld, designated as 22, is disposed inwardly of the vertical plane of the side of the rail head where any interference thereof with the wheel flanges is entirely avoided. Furthermore, the present rail and splice bar combination has the additional important advantage that the top of the splice bar, whether the same be flat as in Fig. 2, or ribbed as in Fig. 3, constitutes a shelf or ledge on which the welding metal may be conveniently supported during the welding operation, and in this connection a preferred construction of the splice bar, especially in the event the top face thereof is formed flat, or substantially flat, is to incline said face more or less outwardly and upwardly, whereby the melted welding metal is caused to flow inwardly into the V-shaped pocket adjacent to the rib 19 and the rail head fillet 14. Moreover, due especially to the inward slope of the lower portion of the side face of the rail, the weld metal receiving pocket between the rail and the top of the splice bar may be of relatively wide or outwardly flaring section, thus to accommodate a relatively large amount of welding metal whereby a weld of large capacity may be formed to possess great strength.

In the embodiments of the invention illustrated in Figs. 1 to 3 the outer edge of the toe of the splice bar is disposed substantially flush with the outer edge of the rail flange. However, the splice bar may be formed to have the outer edge of its toe lie well inwardly with respect to the edge of the rail flange as illustrated in Fig. 4, this arrangement serving to expose an ample outer edge portion of the rail flange for spiking purposes.

From the foregoing it will be observed that by reason of the peculiarities of the head formation of the rail, and of the head formation of the splice bar a large-capacity weld can be made between the head of the rail and the head of the splice bar in a location entirely inside of the vertical plane of the outside of the rail head and therefore out of the way of interference from the car wheel flange. Furthermore, by reason of the location of the head-metal receiving pocket the two sides of the pocket are bounded by large and substantial areas of metal in the head of the rail and in the head of the splice bar available for fusing with the weld metal without in any way weakening the rail or splicing structure. At the same time the construction provides a weld metal support and a weld metal recess freely and openly accessible for the welding operation, while at the same time providing an effective mechanical rail joint which possesses the necessary stiffness and strength to assume and distribute the loading and deflecting forces.

To provide for effecting an efficient weld between the base of the rail and the base of the splice bar, the foot flange of the splice bar may have its under face champered adjacent to its outer edge as indicated at 23, thereby to provide in cooperation with the upper face of the rail flange a V-shaped pocket between the foot flange and the rail flange for the accommodation of the base weld metal designated as 24.

Without further description it is thought that the features and advantages of the invention will be readily apparent to those skilled in the art, and it will of course be understood that changes in the form, proportion and minor details of construction may be resorted to, without departing from the spirit of the invention and scope of the appended claims.

I claim:—

1. A welded rail joint including the rail having a head fillet, the splice bar having loading engagement at its inner upper corner with the head fillet of the rail and clearance at its top from the rail outwardly of said head fillet, and a welded seam between the top of the splice bar and the adjacent face of the rail.

2. A welded rail joint including the rail having a head fillet, the splice bar having loading engagement at its inner upper corner with the head fillet of the rail and clearance at its top from the rail outwardly of said rail head fillet, and a welded seam between the top of the splice bar and the adjacent face of the rail disposed entirely inward of the vertical plane of the side of the rail head.

3. A welded rail joint including the rail having a head fillet, the splice bar having loading engagement at its inner upper corner with the head fillet of the rail, the side of the rail head being inclined inwardly toward the head fillet thereof thereby providing a pocket between the top of the splice bar and the adjacent face of the rail head disposed inwardly of the vertical plane of the side of the rail, and a welded seam formed within said pocket.

4. A welded rail joint including the rail having a head fillet, the splice bar having loading engagement at its inner upper corner with the head fillet of the rail and having a substantially flat top surface, the side of the rail head being inclined inwardly toward the head fillet thereof thereby to provide a pocket between the top of the splice bar and the adjacent face of the rail, and a welded seam formed in said pocket.

5. A welded rail joint including the rail having a head fillet, the splice bar having loading engagement at its inner upper corner with the head fillet of the rail and having a substantially flat outwardly and upwardly inclined top surface, the side of the rail head being inclined inwardly toward the head fillet thereof thereby to provide a pocket between the top of the splice bar and the adjacent face of the rail, and a welded seam formed in said pocket.

6. A welded rail joint including the rail having a head fillet, the splice bar having loading engagement at its inner upper corner with the head fillet of the rail, the side of the rail head being inclined inwardly toward the head fillet thereof, the top of the splice bar having a strengthening rib formation cooperating with the inclined side face of the rail to provide a pocket disposed inwardly of the vertical plane of the side of the rail head, and a welded seam formed in said pocket.

In testimony whereof I hereunto affix my signature.

VICTOR C. ARMSTRONG.